(12) United States Patent
Narayanan et al.

(10) Patent No.: US 11,084,275 B2
(45) Date of Patent: Aug. 10, 2021

(54) METHODS AND SYSTEMS FOR HYBRID DEPOSITION RATE NEAR NET SHAPE ADDITIVE MANUFACTURING

(71) Applicant: Lincoln Global, Inc., Santa Fe Springs, CA (US)

(72) Inventors: Badri K. Narayanan, Mayfield Heights, OH (US); Michael Kottman, Cleveland, OH (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 421 days.

(21) Appl. No.: 15/587,506

(22) Filed: May 5, 2017

(65) Prior Publication Data

US 2018/0319097 A1   Nov. 8, 2018

(51) Int. Cl.
*B33Y 50/02* (2015.01)
*B33Y 30/00* (2015.01)
(Continued)

(52) U.S. Cl.
CPC ............. *B33Y 50/02* (2014.12); *B23K 9/04* (2013.01); *B23K 9/042* (2013.01); *B23K 9/044* (2013.01); *B23K 9/125* (2013.01); *B23K 9/1735* (2013.01); *B23K 9/188* (2013.01); *B23K 37/047* (2013.01); *B29C 64/141* (2017.08); *B33Y 10/00* (2014.12); *B33Y 30/00* (2014.12)

(58) Field of Classification Search
CPC ...... B23K 26/342; B23K 26/348; B23K 9/04; B23K 9/042; B23K 9/044; B23K 9/125;
(Continued)

(56) References Cited

U.S. PATENT DOCUMENTS

| | | |
|---|---|---|
| 6,940,037 B1 | 9/2005 | Kovacevic |
| 7,704,565 B2 | 4/2010 | Slaughter |

(Continued)

FOREIGN PATENT DOCUMENTS

| | | |
|---|---|---|
| CN | 203109235 U | 8/2013 |
| CN | 103802317 A | 5/2014 |

(Continued)

OTHER PUBLICATIONS

Extended European Search Report from Corresponding Application No. EP18171070.8; dated Nov. 7, 2018; pp. 1-10.
(Continued)

*Primary Examiner* — Phuong T Nguyen
*Assistant Examiner* — Bonita Khlok
(74) *Attorney, Agent, or Firm* — David J. Muzilla (57) ABSTRACT

Embodiments of additive manufacturing systems are disclosed. In one embodiment, an additive manufacturing system includes an array of multiple electrodes for sequentially depositing material layer-by-layer to form a three-dimensional (3D) part. The system includes a power source to provide electrical power for establishing a welding arc for each electrode. The system includes a drive roll to drive each electrode. The system also includes a controller to operate the system at a first deposition rate to form first resolution contour portions of a layer of the part. The controller also operates the system at a second deposition rate to form second resolution fill portions of the layer of the part. The system provides variable width deposition at the second deposition rate using a variable number of the electrodes. The first deposition rate is lower than the second deposition rate, and the first resolution is higher than the second resolution.

20 Claims, 8 Drawing Sheets

(51) Int. Cl.
*B33Y 10/00* (2015.01)
*B23K 9/12* (2006.01)
*B23K 9/04* (2006.01)
*B23K 9/173* (2006.01)
*B23K 9/18* (2006.01)
*B23K 37/047* (2006.01)
*B29C 64/141* (2017.01)

(58) Field of Classification Search
CPC .... B23K 9/1735; B23K 9/188; B23K 37/047; B23K 9/073; B23K 9/121; B33Y 50/02; B33Y 10/00; B33Y 30/00; B29C 64/141; B22F 3/1055
USPC .......... 219/76.15, 76.1, 76.14, 73.1
See application file for complete search history.

(56) References Cited

U.S. PATENT DOCUMENTS

| | | |
|---|---|---|
| 9,011,136 B1 | 4/2015 | Massivit |
| 9,266,181 B2 | 2/2016 | Flagg |
| 2011/0168676 A1 | 7/2011 | Peters |
| 2014/0339203 A1* | 11/2014 | Peters ................ B23K 9/04 219/76.14 |
| 2015/0014885 A1 | 1/2015 | Hofmann |
| 2016/0167154 A1 | 6/2016 | Flagg |
| 2017/0106444 A1* | 4/2017 | Ishida ................ B33Y 10/00 |
| 2017/0368637 A1* | 12/2017 | Giese ................ B23K 26/211 |
| 2018/0147669 A1* | 5/2018 | Narayanan ............ B22F 3/008 |

FOREIGN PATENT DOCUMENTS

| | | |
|---|---|---|
| DE | 10 2016 003468 A1 | 9/2016 |
| WO | 2016019434 A1 | 2/2016 |

OTHER PUBLICATIONS

"Hybrid adaptive layer manufacturing: An Intelligent art of direct metal rapid tooling process" by Sreenathbabu Akula and K.P. Karunakaran (www.researchgate.net/publication/222822428_Hybrid_adaptive_layer_manufacturing_An_Intelligent_art_of_direct_metal_rapid_tooling_process) from Robotics and Computer-Integrated Manufacturing 22, published 2006, pp. 113-123 (11 pages).

* cited by examiner

METHODS AND SYSTEMS FOR HYBRID DEPOSITION RATE NEAR NET SHAPE ADDITIVE MANUFACTURING

FIELD

Embodiments of the present invention relate to systems and methods related to welding, or technology resembling welding (e.g., cladding), and more specifically to additive manufacturing using a multi-wire welding system.

BACKGROUND

Conventionally, additive manufacturing processes are able to make near net shape parts at relatively low deposition rates (e.g., powder: 30-100 cm$^3$/hr; wire: 800-2000 cm$^2$/hr) where each part is built up layer-by-layer. Build times can be long and, occasionally, defects such as lack-of-fusion caused by low heat inputs can be created. In some applications, the interior of a part is filled only partially using a grid or hatch pattern to reduce the time and weight of the part. Such an approach works in some applications (typically static, known loading conditions) but often uses a higher-strength and more expensive alloy than a fully dense structure. Many other applications require a fully dense structure to support unpredictable or dynamic loading conditions on the part.

SUMMARY

Embodiments of the present invention include systems and methods related to additive manufacturing using a multi-wire welding system for filling. In one embodiment, a first metal deposition process is used to create the outline or contours of a layer of a part at a first, relatively low, deposition rate. Such a low deposition rate process may be a high resolution process. The first metal deposition process may employ any of gas metal arc welding (GMAW) techniques, gas tungsten arc welding (GTAW) techniques, laser hot wire (LHW) techniques, or blown powder techniques, for example. A second metal deposition process is used to fill in the spaces, defined by the outlines or contours of the part, at a second, relatively high, deposition rate. Such a high deposition rate process may be a low resolution process. The second metal deposition process may employ a parallel multi-wire welding system configured to deposit weld metal material via, for example, a submerged arc welding (SAW) technique. The parallel multi-wire welding system is programmed to deposit weld metal material at areas defined by a computer aided design (CAD) model of the part to be created. The second metal deposition process provides high deposition rates (i.e., higher than the first metal deposition process), a high final density of the part, and the good mechanical properties associated with SAW. The use of multiple wires allows the width and length of the deposited metal material to be varied and controlled to accommodate various channel fill widths and lengths. In one embodiment, the first metal deposition process and the second metal deposition process are run in parallel using a low deposition system (e.g., a LHW system) and a high deposition system (e.g. a parallel multi-wire SAW system). Using such systems in parallel, quality of the manufactured part may be improved by creating skeletons (via a low deposition rate process) and filling the skeletons (via a high deposition rate process) in an iterative manner for each layer of the part (e.g., skeleton+fill followed by a touch-up process using a higher resolution, lower deposition rate process). In accordance with another embodiment, a high deposition rate process may be performed first, followed by a low deposition rate process. Such a sequence of high deposition followed by low deposition may be appropriate for certain additive manufacturing applications. For example, detailed features may be added (using a low deposition subsystem) afterwards onto a substrate layer (that used a high deposition subsystem), where the detailed features are not subsequently filled in. The low deposition subsystem and/or the high deposition subsystem may use parallel gas-shielded electrodes (e.g., in GMAW), in accordance with one embodiment.

One embodiment includes an additive manufacturing system. The additive manufacturing system has an array of multiple electrodes for sequentially depositing material layer-by-layer to form a three-dimensional (3D) part. In one embodiment, the material includes metal. The system also includes a power source configured to provide electrical power for establishing a welding arc for each electrode of the array of multiple electrodes. The system further includes a drive roll configured to independently drive each electrode of the array of multiple electrodes. The system also includes a controller. The controller is configured to operate the additive manufacturing system at a first deposition rate to form first resolution contour portions of a layer of the part. The controller is also configured to operate the additive manufacturing system at a second deposition rate, to form second resolution fill portions of the layer of the part, at least in part by providing variable width deposition at the second deposition rate using a variable number of electrodes of the array of multiple electrodes. The first deposition rate is lower than the second deposition rate, and the first resolution is higher than the second resolution. In one embodiment, the electrodes of the array of multiple electrodes are consumable welding wires. In one embodiment, the additive manufacturing system is a submerged arc welding (SAW) system. The additive manufacturing system includes a rotatable platform for supporting the part, in accordance with one embodiment. The controller is configured to command a rotation of the rotatable platform by 90° between layers. The rotatable platform may be electrically driven, pneumatically driven, or hydraulically driven. The additive manufacturing system includes a translatable platform for supporting the part, in accordance with one embodiment. The controller is configured to command a translation of the translatable platform perpendicular to a direction of travel of the array of multiple electrodes during deposition at the second deposition rate to enable completing of the fill portions of the layer of the part. The translatable platform may be electrically driven, pneumatically driven, or hydraulically driven. In one embodiment, the controller is configured to command a rotation of the array of multiple electrodes and a direction of travel of the array of multiple electrodes by 90° between layers. The rotation of the array of multiple electrodes may be electrically driven, pneumatically driven, or hydraulically driven. In one embodiment, the controller is configured to command a translation of the array of multiple electrodes perpendicular to a direction of travel of the array of multiple electrodes during deposition at the second deposition rate to enable completing of the fill portions of the layer of the part. The translation of the array of multiple electrodes may be electrically driven, pneumatically driven, or hydraulically driven. The controller is programmed to operate the additive manufacturing system to deposit the material at areas defined by a computer aided design (CAD) model of the part.

One embodiment includes an additive manufacturing method. In one embodiment, the method includes operating an additive manufacturing system at a first deposition rate to form first resolution contour portions of a first layer of a three-dimensional (3D) part. The method also includes operating the additive manufacturing system at a second deposition rate, to form second resolution fill portions of the first layer of the part, at least in part by providing variable width deposition at the second deposition rate by variably controlling a number of electrodes of an array of multiple electrodes of the additive manufacturing system along a direction of travel. The first deposition rate is lower than the second deposition rate, and the first resolution is higher than the second resolution. In one embodiment, the method includes translating the part perpendicular to the direction of travel of the array of multiple electrodes during deposition at the second deposition rate to enable completing of the fill portions of the first layer of the part. In one embodiment, the method includes rotating the part 90° degrees, operating the additive manufacturing system at the first deposition rate to form first resolution contour portions of a second layer of the three-dimensional (3D) part, and operating the additive manufacturing system at the second deposition rate, to form second resolution fill portions of the second layer of the part. Again, variable width deposition is provided at the second deposition rate by variably controlling a number of electrodes of the array of multiple electrodes of the additive manufacturing system along the direction of travel. In one embodiment, the method includes translating the array of multiple electrodes perpendicular to the direction of travel of the array of multiple electrodes during deposition at the second deposition rate to enable completing of the fill portions of the first layer of the part. In one embodiment, the method includes rotating the array of multiple electrodes and the direction of travel of the array of multiple electrodes by 90°, operating the additive manufacturing system at the first deposition rate to form first resolution contour portions of a second layer of the three-dimensional (3D) part, and operating the additive manufacturing system at the second deposition rate to form second resolution fill portions of the second layer of the part. Variable width deposition is provided at the second deposition rate by variably controlling a number of electrodes of the array of multiple electrodes of the additive manufacturing system along the direction of travel as rotated.

One embodiment includes an additive manufacturing system for sequentially depositing material layer-by-layer to form a three-dimensional (3D) part. The system includes a first subsystem configured to deposit material at a first deposition rate to form first resolution contour portions of a layer of the part. The system also includes a second subsystem configured to deposit material at a second deposition rate to form second resolution fill portions of the layer of the part. The second subsystem includes an array of multiple electrodes and a power source configured to provide electrical power for establishing a welding arc for each electrode of the array of multiple electrodes. The second subsystem also includes a drive roll configured to independently drive each electrode of the array of multiple electrodes. The second subsystem further includes a controller configured to operate the second subsystem at the second deposition rate at least in part by providing variable width deposition at the second deposition rate using a variable number of electrodes of the array of multiple electrodes. The first deposition rate is lower than the second deposition rate and the first resolution is higher than the second resolution. In one embodiment, the electrodes of the array of multiple electrodes are consumable welding wires. In one embodiment, the second subsystem is a submerged arc welding (SAW) system. In one embodiment, the first subsystem is a laser hot wire (LHW) system, a gas tungsten arc welding (GTAW) system, or a blown powder system.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Embodiments of additive manufacturing systems and methods are disclosed. In one embodiment, an additive manufacturing system is a multi-wire submerged arc welding (SAW) system having an array of multiple electrodes for sequentially depositing material layer-by-layer to form a three-dimensional (3D) part. The multi-wire SAW system is operated at a specified deposition rate, to form fill portions of layers of the part, at least in part by providing variable width deposition at the specified deposition rate using a variable number of electrodes of the array of multiple electrodes. Each electrode of the array of multiple electrodes may be made of the same materials, or different electrodes may be made of different materials. In one embodiment, the electrode materials include metal materials.

Figure 1:
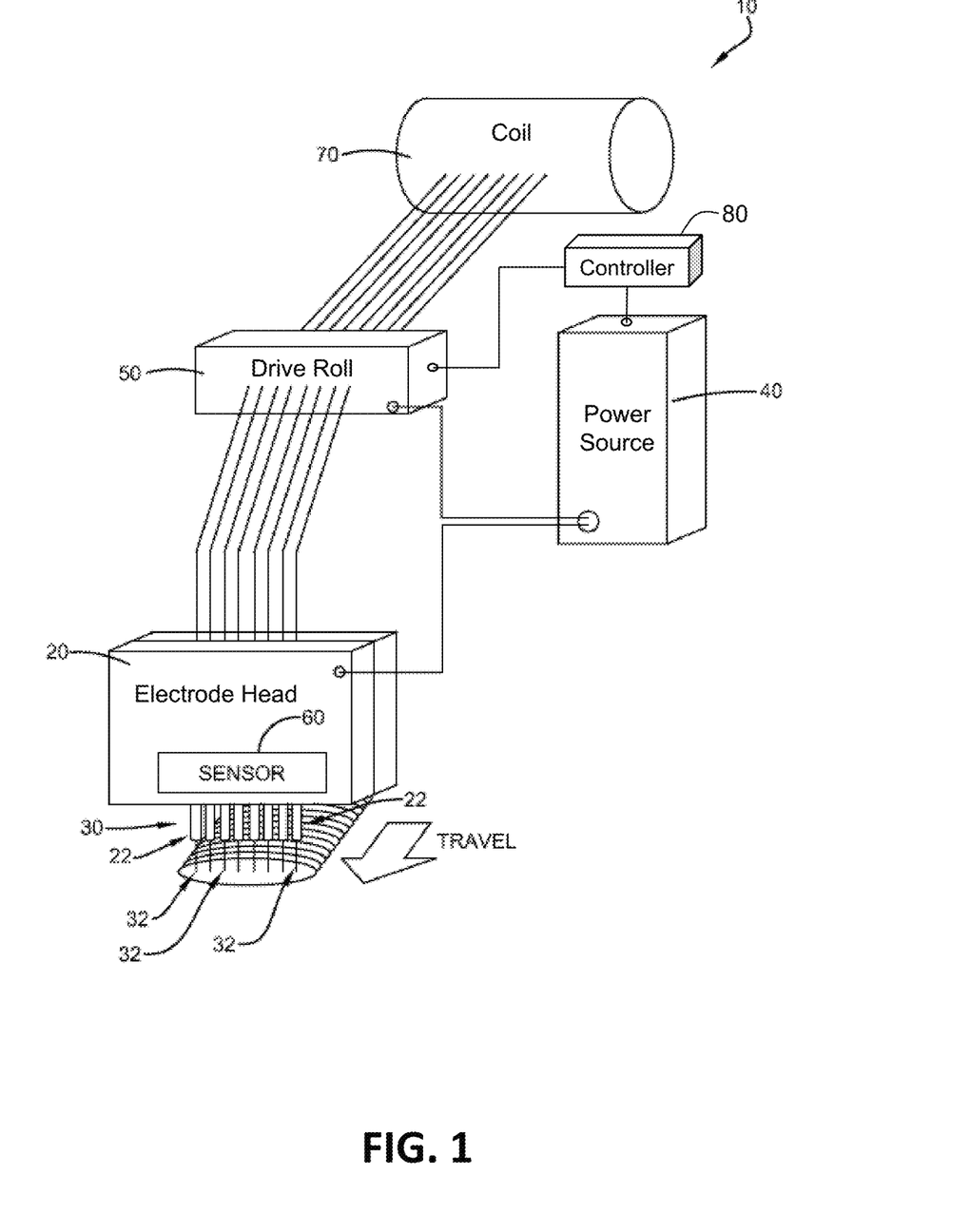
FIG. 1 illustrates an embodiment of a multi-electrode additive manufacturing system.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates an embodiment of an additive manufacturing system depicted generally at 10. It is envisioned that system 10 may typically be used to additively manufacture a part, layer-by-layer, by a submerged arc or electroslag welding process, although other welding processes such as, for example, gas metal arc welding (GMAW), flux-cored arc welding (FCAW), and gas tungsten arc welding (GTAW) may also be employed.

As illustrated in FIG. 1, additive manufacturing system 10 includes an electrode head 20, wherein the electrode head 20 concurrently houses an array 30 of multiple electrodes 32 (e.g. consumable welding electrodes/wires). It is to be appreciated that the multiple electrodes 32 can be continuously fed, periodically fed, or fed based on a predetermined order (discussed in more detail below). The electrodes 32 may be gas-shielded, self-shielded, or metal cored. These electrodes may be solid core, metal core, or flux cored wires, to be used under gas shielding, under a submerged arc flux, or in an electroslag process. In the instance of cored electrodes, it is contemplated that the electrode sheath may be carbon steel, stainless steel, or a nickel alloy. The electrode head 20 houses the array 30 such that electrodes 32 are in a spaced apart configuration for controllably depositing material to form a layer of a part (e.g., by initially depositing material on a surface of an associated workpiece). It is to be appreciated and understood that the electrode head 20 can be any suitable electrode head that houses the array 30 to deliver the electrodes 32 and the subject innovation is not to be limited by the electrode head illustrated herein. For example, the electrode head 20 can be an assembly that utilizes individual contact tips for the array 30 or a contact assembly that universally houses and encases the electrode array 30. The electrodes 32 may be provided from a coil 70. The coil 70 may include a plurality of individual coils, each coil containing a single electrode (e.g., a welding wire), which are arranged along a common axis of rotation. Still any manner of delivering filler wire or additive material may be chosen without departing from the intended scope of coverage of the embodiments of the subject disclosure.

As illustrated in FIG. 1, electrode head 20 is adapted to receive the array 30 of associated multiple fed electrodes 32. The system 10 includes means for driving the array 30 of electrodes 32 through the electrode head 20. It is envisioned that the means for driving includes a plurality of drive rolls 50 or other wire feeder device. Each of the plurality of drive rolls 50 may be associated with one or more of the electrodes 32. In one aspect, two electrodes 32 may be associated with a single set of drive rolls 50, although it is envisioned that the relationship between the number of electrodes and the number of wire feeders may be configured such that any number of electrodes may be associated with a single set of drive rolls as appropriate in an additive manufacturing process without departing from the intent of the subject disclosure. In another embodiment, each electrode can be driven by a respective drive roll 50. In another embodiment, the electrode(s) can be driven by drive roll 50 based on a predetermined order or a second predetermined order to which welding arcs are established with one or more electrodes. In other words, if a predetermined order establishes a welding arc between a first electrode, then a second and third electrode, a first drive roll 50 can drive the first electrode and a second drive roll 50 can drive the second and third electrode. Still, other relationships between drive roll 50 and one or more electrodes may be employed with sound engineering judgment.

In one example embodiment, the drive rolls 50 may be configured to drive the electrodes 32 through the electrode head 20 at a rate (e.g., a wire feed speed). In one embodiment, the electrodes 32 can be driven at substantially the same rate. In another embodiment, each electrode 32 can be driven at a respective rate that can be predetermined or dynamically identified during an additive manufacturing procedure. For instance, a rate (e.g., a wire feed speed) for one or more electrodes 32 can be predetermined based on material composition, type of weld, welding parameters, workpiece, among others. In another embodiment, a rate for one or more electrodes can be dynamically identified during the additive manufacturing process based upon criteria such as, but not limited to, user input, feedback, voltage, current, and temperature, among others.

Alternatively, the drive rolls 50 are configured to feed the electrodes 32 at slower and/or faster wire speeds/wire feed rates, where it may be desired to change the current needed to melt off the electrode, thereby changing the heat input by the electrode 32 into the molten layer material. For example, one set of drive rolls 50 may be configured to feed the electrodes 32 arranged at the outside of the array 30 at one wire feed speed, while a different set of drive rolls 50 may be configured to feed the electrodes 32 arranged at the inside of the array 30 at a relatively lower wire feed speed as compared to the wire feed speed of the outer electrodes.

It is to be appreciated that a drive roll 50 can be used to drive one or more electrodes based on a predetermined speed. For instance, each drive roll 50 can be used to drive a respective electrode 32 in the array 30, wherein each electrode is driven at a specific and particular wire feed speed. For instance, the wire feed speed for each electrode 32 can vary based upon, but not limited to, wire type, part material composition, environment (e.g., air temperature, humidity, and the like), wire gauge, electrode type, voltage, current, welding device used to perform the additive manufacturing operation, among others.

In one aspect of the embodiments of the subject invention, each of the electrodes 32 is configured to be connected to welding power source 40. That is to say that during the additive manufacturing process, for instance, welding power can be delivered through each of the electrodes 32 in the array 30. Accordingly, additive material is delivered over a width of the electrode head 20. As indicated above, power may be delivered from the welding power source 60 through welding cables (not shown) as attached at one end to studs (not shown). At the distal end, welding cables may be connected to the electrode head 20 through an electrode head connector. In the exemplary case of a single welding power source 40, a single electrode head connector may convey power from the welding cables commonly to the electrode head 20. Still, other means for conveying power from the welding cables to the electrode head 20 may be employed with sound engineering judgment.

Figure 2:
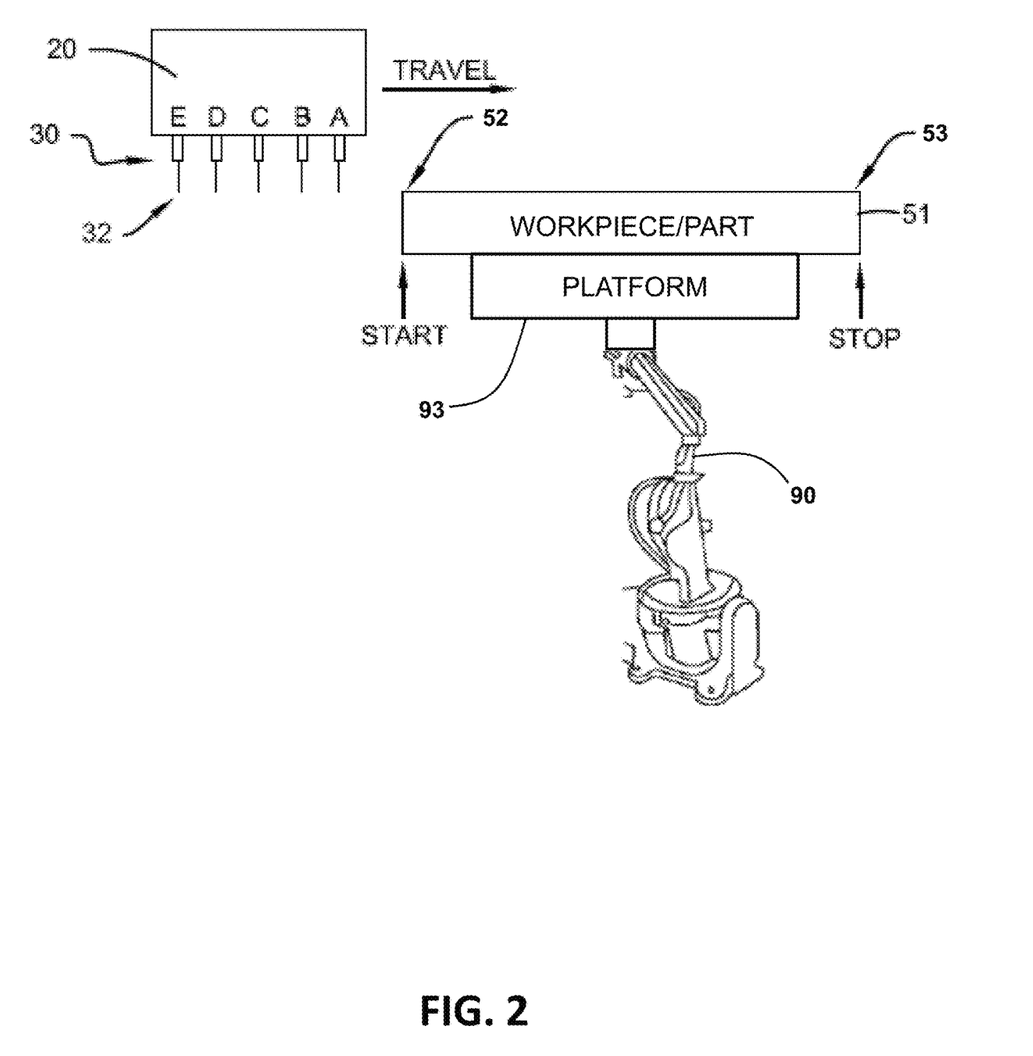
FIG. 2 illustrates an embodiment of an electrode head having multiple electrodes in an array that are configured to deposit material onto a workpiece in a direction of travel.

The power source 40 supplies electrical power for establishing a welding arc between each of the associated multiple fed electrodes and the associated workpiece or part 51 (see FIG. 2). In particular, one or more power sources 40 can supply power to one or more electrodes 32 of the array 30 based on a predetermined order. For instance, the predetermined order can be based on a location of the electrode head 20 on the workpiece or part 51. In another instance, the predetermined order can be based on a starting of a motion of the electrode head 20 to begin an additive manufacturing process. In another embodiment, one or more power sources 40 terminate the welding arc between each of the associated multiple fed electrodes and the associated workpiece or part 51. In such an embodiment, the one or more power sources 40 can terminate the welding arc for one or more of the electrodes 32 of the array 30 with a second predetermined order. For instance, the second predetermined order can be based on a location of the electrode head 20 on the workpiece or part 51. In another example, the second predetermined order can be based on a stopping of a motion of the electrode head 20 to end an additive manufacturing process.

Furthermore, an establishment of a welding arc between an electrode 32 and the workpiece or part 51 can be provided by at least one of the power source 40 (e.g., supplying power, not supplying power, terminating power supply, and the like) or drive roll(s) 50 (e.g., driving electrode(s), not driving electrode(s), terminating drive of electrode, and the like). Thus, the electrodes 32 in the array 30 can be activated or deactivated based on a predetermined order, wherein the activation and/or deactivation can be based on the power source 40 and/or drive roll(s) 50. In an embodiment, the subject innovation relates to providing controlled establishment of welding arcs to the electrodes 32 and/or controlled drive to the electrodes 32 for additive manufacturing processes. As such, individual electrodes can be effectively "turned on" or "turned off" to enable the creation of contoured 2D shapes within a layer.

In a particular embodiment, a sensor 60 is configured to detect at least one of a location of the electrode head 20 on the workpiece or part 51, an alignment of at least one electrode 32 of the array 30 compared to the workpiece or part 51, or a nonalignment of at least one electrode 32 of the array 30 compared to the workpiece or part 51. The sensor 60 can be coupled or affixed to the electrode head 20 at a location in order to detect a location of at least one electrode 32 in reference to the workpiece or part 51. For instance, the sensor 60 is situated on the electrode head 20 in a horizontal manner, yet it is to be appreciated that any suitable orientation can be employed. In another embodiment, a plurality of sensors 60 can be used. For example, a sensor can be used for each electrode 32. In such an example, the sensor 60 for each electrode 32 can be oriented vertically in line with the respective electrode 32. By way of example and not limitation, the sensor 60 can be an infrared (IR) sensor or a proximity sensor, among others. The sensor 60 detects alignment and/or nonalignment of at least one electrode 32 with respect to at least a portion of the workpiece or part 51. In particular, the sensor 60 detects whether an electrode 32 is in contact and/or not in contact with a portion of the workpiece or part 51 to establish a welding arc. In another example, the sensor 51 can detect whether a current and/or voltage flow is established through the power source 40 and the workpiece or part 51. It is to be appreciated that an alignment of one or more electrodes 32 refers to a contact that allows a welding arc to establish between the workpiece or part 51 and the electrode 32. Moreover, it is to be appreciated that a nonalignment of one or more electrodes 32 refers to a noncontact that does not allow a welding arc to establish between the workpiece or part 51 and electrode 32.

In accordance with one embodiment, the system 10 includes a controller 80 which controls the power source 40, the drive roll 50, and the electrode head 20. For example, the controller 80 controls the operating characteristics (output voltage, output current, output waveform, etc.) of the electrical power of the power source 40. The controller 80 also controls the operating characteristics of the drive roll 50 (e.g., wire feed speed and arc establishment for each electrode 32 in the array 30). Furthermore, the controller 80 controls the operating characteristics of the electrode head 20 (e.g., position, travel speed, etc.). In accordance with one embodiment, the controller 80 may be integrated into the power source 40.

In one embodiment, the additive manufacturing system 10 is a submerged arc welding (SAW) system that is controlled by the controller 80 to operate the additive manufacturing system 10 at a first deposition rate to form first resolution contour portions of a layer of the part 51. The contour portions form a near net outline of the particular layer of the part 51 which are to be filled in. The controller 80 also operates the additive manufacturing system 10 at a second deposition rate to form second resolution fill portions of the layer of the part (i.e., to fill in between the contour portions). The fill portions of the layer may be formed by providing variable width deposition at the second deposition rate using a variable number of electrodes 32 of the array of multiple electrodes in the electrode head 20 based on predetermined orders, for example, as described below herein.

The establishment of a welding arc for one or more electrodes 32 and/or drive of the electrodes 32 can be based on a predetermined order. Moreover, the termination of a welding arc and/or drive for one or more of the electrodes 32 can be based on a predetermined order. In another embodiment, the termination of a drive of at least one drive roll can be based on a predetermined order. The following are examples of various predetermined orders that can be employed with the subject innovation but are solely for example and are not to be seen as limiting on the various embodiments disclosed herein. Moreover, the following examples are based on an electrode head 20 having five (5) electrodes in the array 30. Yet, any number of electrodes 32 for the array 30 may be chosen with sound engineering judgment without departing from the intended scope of coverage of the embodiments of the subject invention. Moreover, the electrodes 32 for the array may be configured in any pattern (e.g., linearly, non-linearly, among others) with sound engineering judgment without departing from the intended scope of coverage of the embodiments of the subject invention.

For example, referring to FIG. 2, the electrodes A, B, C, D, and E can be in the electrode head 20. In the example, a sequential establishment of an arc for each electrode can be a basis for a predetermined order such that welding arcs are established in the following order: A; B; C; D; and E. In another example, the predetermined order can be sequential but include electrodes establishing an arc at substantially the same time such as the following order: A and B; C; D and E. In another example, the predetermined order can be as follows: A and B; C; D; and E. In another example, the predetermined order can be the following: E; D; C; B; and A. In still another example, the order can be as follows: E and D; C; B and A. In another instance, the predetermined order can be: E and D; C; B; and A.

In a particular example, a predetermined order can be used to establish a welding arc for one or more of the electrodes 32 and a second predetermined order can be used to terminate the welding arc for one or more of the electrodes 32. For instance, the above examples can be used as a predetermined order and/or a second predetermined order. In one embodiment, during a start of an additive manufacturing operation with the additive manufacturing system 10, a predetermined order can be used such that the welding arcs are established as follows: A; B; C; D; and E. During a stop of the additive manufacturing operation, a second predetermined order can be used such that the welding arcs are terminated as follows: A; B; C; D; and E. It is to be appreciated that any suitable combination, order and/or pattern can be utilized to establish a welding arc and/or terminate a welding arc for one or more of the electrodes 32.

Referring to FIG. 2 the electrode head 20, having five (5) electrodes 32 in the array 30, can deposit material onto the workpiece or part 51 in a direction of travel. Conventionally, the electrodes 32 in the array 30 are driven continuously and simultaneously. Additionally, conventional techniques establish welding arcs for electrodes 32 simultaneously. The subject innovation allows a predetermined order for welding arc establishment and/or drive of the electrodes 32 in order to deposit material onto the workpiece or part 51. For instance, the workpiece or part 51 includes a start point 52 (e.g., a start location) and stop point 53 (e.g., a stop location), wherein the start point 52 corresponds to a start of motion for deposition by the electrode head 20 and the stop point corresponds to a stop of motion for deposition by the electrode head 20. For instance, the sensor 60 can detect the start point 52 and/or the stop point 53. It is to be appreciated that the start point 52 and the stop point 53 can be any location on the workpiece or part 51 although depicted on ends opposite of one another in FIG. 2.

In general, a predetermined order can be employed for establishment of welding arcs for the electrodes 32 and/or drive of the electrodes 32. In FIG. 2, a sequential order can be the predetermined order in which an electrode is activated and/or driven one-at-a-time based on placement in the electrode head 20. For example, the electrodes 32 can have welding arcs established in a sequence starting from right to left (e.g., A; B; C; D; then E) to correspond to deposit of material on the workpiece or part 51 in accordance with the start point 52. For example, the electrodes 32 can be driven in a sequence starting from right to left (e.g., A; B; C; D; then E) to correspond to deposit of material on the workpiece or part 51 in accordance with the start point 52. Additionally, a sequential order can be the predetermined order in which an electrode is deactivated and/or not driven one-at-a-time based on placement in the electrode head 20. For example, the electrodes 32 can have welding arcs terminated in a sequence starting from right to left (e.g., A; B; C; D; then E) to correspond to deposit of material on the workpiece or part 51 in accordance with the stop point 53. For example, drive of the electrodes 32 can be terminated in a sequence starting from right to left (e.g., A; B; C; D; then E) to correspond to deposit of material on the workpiece or part 51 in accordance with the stop point 53.

In another embodiment, a start of motion can include a predetermined order for drive of the electrodes 32 and/or establishing welding arcs for the electrodes 32. Still further, a stop of motion can include a second predetermined order for a drive of the electrodes 32 to terminate a welding arc for the electrodes 32. It is to be appreciated that a predetermined order (e.g., for electrode 32 drive and/or establishment of welding arcs) can correspond to a location of the electrode head 20 compared to the workpiece or part 51, a start of motion of the electrode head 20, a start of an additive manufacturing process, and the like. Moreover, it is to be appreciated that a second predetermined order (e.g., for termination of the electrode 32 drive and/or termination of welding arcs) can correspond to a location of the electrode head 20 compared to the workpiece or part 51, a stop of motion of the electrode head 20, a stop of an additive manufacturing process, and the like. However, in accordance with one embodiment, each of the electrodes 32 may be independently controlled by the controller 80 with respect to arc starting/stopping, wire starting/stopping, and wire feed speed as the electrode head 20 is also controlled to move along a travel direction at a controlled travel rate. In accordance with one embodiment, control of each of the electrodes 32 by the controller is related to a CAD model for determining how material is deposited at areas defined by the CAD model.

Figure 3:
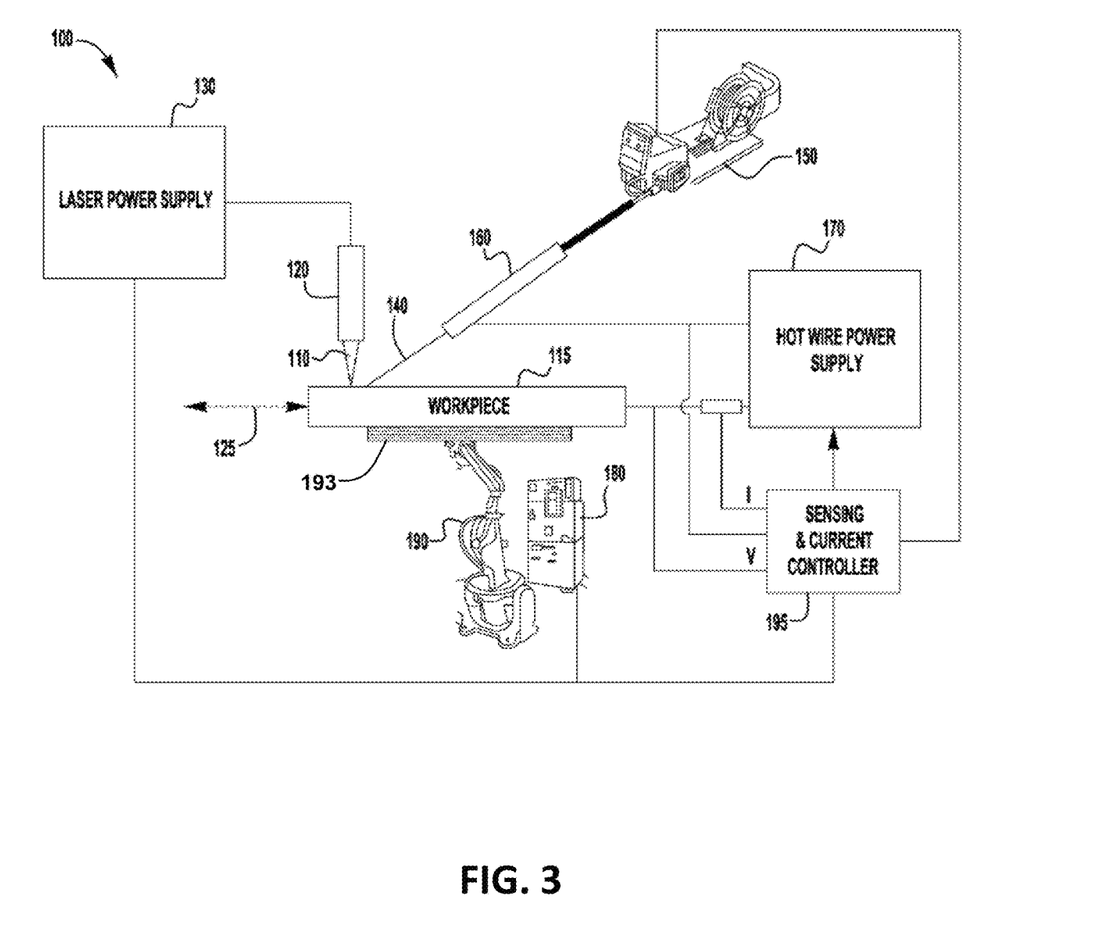
FIG. 3 illustrates an embodiment of a laser hot wire (LHW) additive manufacturing system.

FIG. 3 illustrates a functional schematic block diagram of an exemplary embodiment of a combination filler wire feeder and energy source system 100 for performing additive manufacturing. In one embodiment, FIG. 3 illustrates an embodiment of a laser hot wire (LHW) additive manufacturing system. The system 100 includes a laser subsystem capable of focusing a laser beam 110 onto a workpiece or part 115 to heat the workpiece or part 115. The laser subsystem is a high intensity energy source. The laser subsystem can be any type of high energy laser source, including but not limited to carbon dioxide, Nd:YAG, Yb-disk, YB-fiber, fiber delivered, or direct diode laser systems. Other embodiments of the system may include at least one of an electron beam, a plasma arc welding subsystem, a gas tungsten arc welding subsystem, a gas metal arc welding subsystem, a flux cored arc welding subsystem, or a submerged arc welding subsystem serving as the high intensity energy source. In accordance with another embodiment, a portion of the elements of the system 100 may be configured as a blown powder system.

The following will repeatedly refer to the laser system, the beam, and the power supply. However, it should be understood that this reference is exemplary, as any high intensity energy source may be used. For example, a high intensity energy source can provide at least 500 W/cm$^2$. The laser subsystem includes a laser device 120 and a laser power supply 130 operatively connected to each other. The laser power supply 130 provides power to operate the laser device 120.

The additive manufacturing system 100 also includes a hot filler wire feeder subsystem capable of providing at least one resistive filler wire 140 to make contact with the workpiece or part 115 in the vicinity of the laser beam 110. Of course, it is understood that by reference to the workpiece or part 115 herein, the molten puddle is considered part of the workpiece or part 115, thus reference to contact with the workpiece or part 115 includes contact with the puddle. The wire feeder subsystem includes a filler wire feeder 150, a contact tube 160, and a power supply 170. During operation, the filler wire 140 is resistance-heated by electrical current from the power supply 170 which is operatively connected between the contact tube 160 and the workpiece or part 115. In accordance with one embodiment, the power supply 170 is a pulsed direct current (DC) power supply, although alternating current (AC) or other types of power supplies are possible as well. The wire 140 is fed from the filler wire feeder 150 through the contact tube 160 toward the workpiece or part 115 and extends beyond the tube 160. The extension portion of the wire 140 is resistance-heated such that the extension portion approaches or reaches the melting point before contacting a puddle on the workpiece or part. The laser beam 110 serves to melt some of the base metal of the workpiece or part 115 to form a puddle and can also be used to melt the wire 140 onto the workpiece or part 115. The power supply 170 provides energy needed to resistance-melt the filler wire 140. In some embodiments the power supply 170 provides all of the energy needed while in other embodiments the laser or other high energy heat source can provide some of the energy. The feeder subsystem may be capable of simultaneously providing one or more wires, in accordance with certain other embodiments of the present invention.

The system 100 further includes a motion control subsystem capable of moving the laser beam 110 (energy source) and the resistive filler wire 140 in a same direction 125 along the workpiece or part 115 (at least in a relative sense) such that the laser beam 110 and the resistive filler wire 140 remain in a fixed relation to each other. According to various embodiments, the relative motion between the workpiece or part 115 and the laser/wire combination may be achieved by actually moving the workpiece or part 115 or by moving the laser device 120 and the wire feeder subsystem. In FIG. 3, the motion control subsystem includes a motion controller 180 operatively connected to a robot 190 having a platform 193 (e.g., a rotatable platform and/or a translatable platform). The motion controller 180 controls the motion of the robot 190. The robot 190 is operatively connected (e.g., mechanically secured) to the workpiece or part 115 via the platform 193 to move the workpiece or part 115 in the direction 125 such that the laser beam 110 and the wire 140 effectively travel along the workpiece or part 115. In accordance with an alternative embodiment of the present invention, the laser device 110 and the contact tube 160 may be integrated into a single head. The head may be moved along the workpiece or part 115 via a motion control subsystem operatively connected to the head. In some embodiments, the motion controller 180 is programmed to control the robot 190 such that the platform 193 may be rotated 90° and/or translated in a direction that is perpendicular to the direction of travel 125.

Similarly, a platform 93 and robot 90 (see FIG. 2), that are analogous to the platform 193 and robot 190, may be used in the additive manufacturing system 10 of FIG. 1 to rotate and/or translate the workpiece or part 51, as controlled by the controller 80, in accordance with one embodiment. In an alternative embodiment, motion of the electrode head 20 of the additive manufacturing system 10 of FIG. 1 may be similarly controlled by the controller 80 to rotate and/or translate the electrode head 20. Reasons for providing such rotation and/or translation are discussed later herein.

In general, there are several methods in which a high intensity energy source/wire may be moved relative to a workpiece or part. If the workpiece or part is round, for example, the high intensity energy source/wire may be stationary and the workpiece or part may be rotated under the high intensity energy source/wire. Alternatively, a robot arm or linear tractor may move parallel to the round workpiece or part and, as the workpiece or part is rotated, the high intensity energy source/wire may move continuously or index once per revolution to, for example, overlay the surface of the round workpiece or part. If the workpiece or part is flat or at least not round, the workpiece or part may be moved under the high intensity energy source/wire as shown if FIG. 3. However, a robot arm or linear tractor or even a beam-mounted carriage may be used to move a high intensity energy source/wire head relative to the workpiece or part. The robot 190 driving the platform 193 may be driven electrically, pneumatically, or hydraulically, in accordance with various embodiments.

The additive manufacturing system 100 further includes a sensing and current control subsystem 195 which is operatively connected to the workpiece or part 115 and the contact tube 160 (i.e., effectively connected to the output of the power supply 170) and is capable of measuring a potential difference (i.e., a voltage V) between and a current (I) through the workpiece or part 115 and the wire 140. The sensing and current control subsystem 195 may further be capable of calculating a resistance value (R=V/I) and/or a power value (P=V*I) from the measured voltage and current. In general, when the wire 140 is in contact with the workpiece or part 115, the potential difference between the wire 140 and the workpiece or part 115 is zero volts or very nearly zero volts. As a result, the sensing and current control subsystem 195 is capable of sensing when the resistive filler wire 140 is in contact with the workpiece or part 115 and is operatively connected to the power supply 170 to be further capable of controlling the flow of current through the resistive filler wire 140 in response to the sensing. In accordance with another embodiment, the sensing and current controller 195 may be an integral part of the power supply 170.

In accordance with one embodiment, the motion controller 180 may further be operatively connected to the laser power supply 130 and/or the sensing and current controller 195. In this manner, the motion controller 180 and the laser power supply 130 may communicate with each other such that the laser power supply 130 knows when the workpiece or part 115 is moving and such that the motion controller 180 knows if the laser device 120 is active. Similarly, in this manner, the motion controller 180 and the sensing and current controller 195 may communicate with each other such that the sensing and current controller 195 knows when the workpiece or part 115 is moving and such that the motion controller 180 knows if the filler wire feeder subsystem is active. Such communications may be used to coordinate activities between the various subsystems of the additive manufacturing system 100.

As is generally known, additive manufacturing is a process in which a material is deposited onto a workpiece or part so as to create a desired manufactured product. In some applications the article of manufacture can be quite complex. However, known methods and systems used for additive manufacturing tend to be slow and have limited performance. Embodiments of the present invention address those areas by providing a high speed and highly accurate additive manufacturing method and system.

The system 100 depicted in FIG. 3 is such an exemplary system, where the wire 140 is repeatedly melted, in droplets, and deposited onto the workpiece to create the desired shape. A surface of the workpiece or part is irradiated by the laser beam 110 (or other heat source) while the wire 140 is not in contact with the workpiece or part. The beam 110 creates a molten puddle on the surface of the workpiece or part. In most applications the puddle has a small area and the level of penetration is not that which would be required for other operations, such as welding or joining. Rather, the puddle is created so as to prepare the surface of the workpiece or part to receive and cause sufficient bonding with a droplet from the wire 140. Thus, the beam density of the beam 110 is to be such that only a small puddle is created on the workpiece or part, without causing too much heat input into the workpiece or part, or to create too large of a puddle. Upon creation of the puddle, a droplet is formed on the distal end of the wire 140 as the wire is advanced to the puddle so as to make contact with the puddle. After contact, the droplet is deposited onto the puddle and workpiece or part. This process is repeated so as to create a desired workpiece or part. In one embodiment, the beam 110 is directed at the deposited droplet after it is separated from the wire 140. In an embodiment, the beam 110 can be used to smooth the surface of the workpiece or part and/or add additional heat to allow the droplet to be fully integrated to the workpiece or part. Further, the beam can be used to provide additional shaping of the workpiece or part.

As such, a first additive manufacturing system 10 and a second additive manufacturing system 100 have been described herein. The additive manufacturing systems 10 and 100 may be used separately or in combination (e.g., as subsystems to form a larger system) to perform additive manufacturing operations as described herein. For example, in one embodiment, the system 10 may be used as a first subsystem in combination with the system 100 used as a second subsystem to form a combined or hybrid system. In the hybrid system, the subsystem 100 is used to deposit material at a first deposition rate to form first resolution contour portions of a layer of a part which are to be subsequently filled with material. The subsystem 10 is used to deposit material at a second deposition rate to form second resolution fill portions of the layer of the part at least by providing variable width deposition at the second deposition rate using a variable number of electrodes of an array of multiple electrodes in an electrode head, for example. In one embodiment, the first deposition rate is lower than the second deposition rate and the first resolution is higher than the second resolution. In this manner, a part can be additively manufactured layer-by-layer, where each layer is built by first performing high resolution contour construction at the first deposition rate using the subsystem 100 and then performing low resolution fill construction at the second deposition rate using the subsystem 10.

In another embodiment, the additive manufacturing system 10 may be used by itself to additively manufacture a part layer-by-layer. Each layer is built by first performing high resolution contour construction at the first deposition rate using, for example, one electrode of the system 10, and then performing low resolution fill construction at the second deposition rate using multiple electrodes of the system 10. Again, the high resolution contour construction is performed at a first deposition rate and the low resolution fill construction is performed at a second deposition rate, where the first deposition rate is lower than the second deposition rate.

Figure 4A:
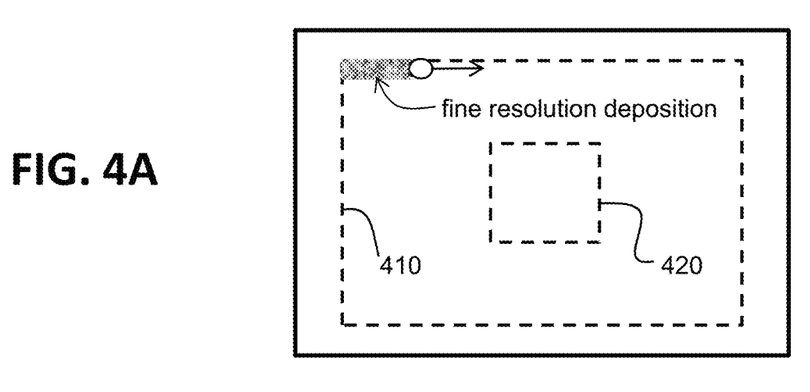
FIGS. 4A-4C illustrate an embodiment of a first deposition rate contour process followed by a second deposition rate fill process used to additively manufacture a part using at least the additive manufacturing system of FIG. 1.
Figure 4B:
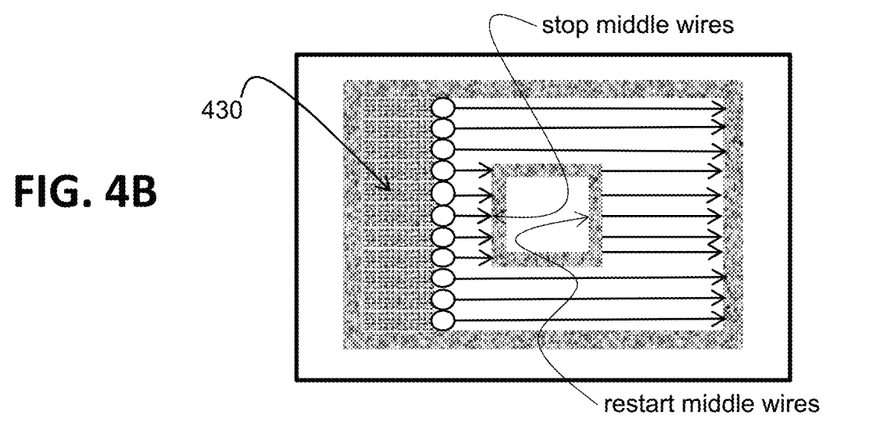
Figure 4C:
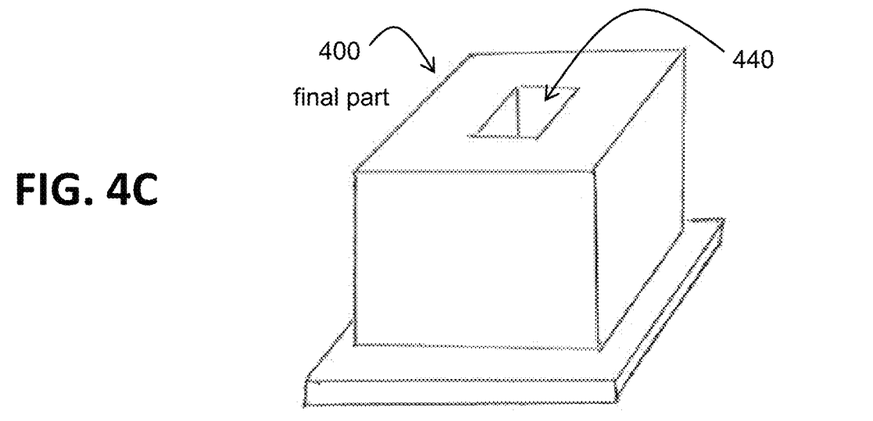

FIGS. 4A-4C illustrate an embodiment of a first deposition rate contour process followed by a second deposition rate fill process used to additively manufacture a part 400, layer-by-layer, using at least the additive manufacturing system 10 of FIG. 1. In FIG. 4A, a single electrode (represented by a circle in FIG. 4A) of the system 10 is used to deposit the contour portions 410 and 420 of a layer of the part 400 at a low deposition rate. Using a single electrode at a low deposition rate provides fine resolution deposits of the contour portions. In other embodiments, where the resolution requirements are not as strict, two or three electrodes may be used to deposit the contour portions, for example.

In FIG. 4B, multiple electrodes (represented by circles in FIG. 4B) of the system 10 are used to deposit fill portions 430 of the layer across the part 400 at a high deposition rate. Using multiple electrodes at a high deposition rate provides low resolution deposits of the fill portions 430. The contour portions 410 and 420 act as boundaries or borders which outline the fill portions 430. As depicted in FIG. 4B, the multiple electrodes deposit material across the layer of the part 400 such that a rectangular hole 440 (an example of a feature) is formed in the layer. Deposition of material by the middle electrodes (wires) of the multiple electrodes are stopped and restarted to form the rectangular hole 440. In accordance with other embodiments, other features (e.g., other than holes) may be formed in layers of a part by controlling deposition of material by turning electrodes "on and off" as the system 10 moves across the part. In this manner, the system 10 is able to form deposited features of varying width and length.

In FIG. 4C, the final additively manufactured part 400 is illustrated. The part 400 is built-up, for example, layer-by-layer in accordance with a computer-aided design (CAD) model of the part 400 such that material is deposited at areas defined by the CAD model (e.g., as controlled by a controller of an additive manufacturing system). The rectangular hole 440 is depicted as going through all of the layers of the part 400. The process illustrated in FIGS. 4A-4C provides high fill deposition rates, high final density, and good mechanical properties associated with SAW. In one embodiment, the part 400 may be made of alternate layers of hard and soft materials. In another embodiment, the contour portions may be made of a different material than the fill portions. Furthermore, in accordance with one embodiment, a final finishing step may be performed on the part (e.g., machining, heat treating, forging, etc.).

In accordance with another embodiment, the contour portions can be deposited by the system 100 of FIG. 3 and the fill portions can be deposited by the system 10 of FIG. 1. In this manner, independent and parallel low deposition and high deposition processes can be performed to improve quality by creating the contour portions (low deposition process) and the fill portions (high deposition process) iteratively.

Figure 5:
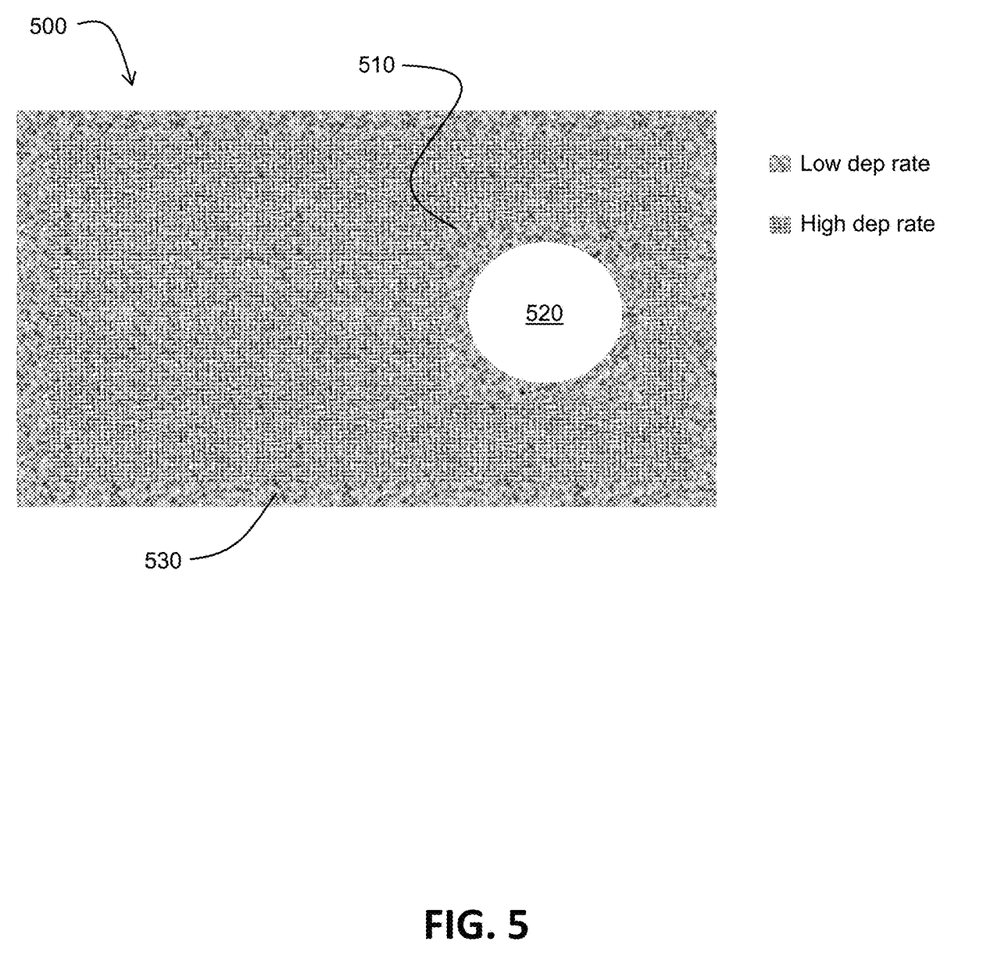
FIG. 5 illustrates an embodiment of creating primitive internal geometries of a part using a first deposition rate process to enable use of a second deposition rate fill process using at least the additive manufacturing system of FIG. 1.

FIG. 5 illustrates an embodiment of creating primitive internal geometries of a part 500 using a first deposition rate process to enable use of a second deposition rate fill process using at least the additive manufacturing system 10 of FIG. 1. For complex internal geometries that are not easily filled in by the high deposition rate process, the low deposition rate process can be used to fill out more of the layer to create a primitive fill geometry. For example, as shown in FIG. 5, a square feature 510 having a circular hole 520 can be formed within a layer of the part 500 using the low deposition rate process. The outer contour portion 530 may also be formed using the low deposition rate process. The high deposition rate process can then be used to fill-in the remaining portion of the layer using multiple electrodes of, for example, the system 10 of FIG. 1. In general, the low deposition rate process may be used to form any complex internal or external features.

In accordance with one embodiment, as fill portions are being deposited, the part may be translated perpendicular to the direction of travel of the electrode head 20 of the system 10 of FIG. 1 to accommodate parts that are wider than the head 20. Alternatively, in another embodiment, the electrode head 20 may be translated perpendicular to the direction of travel instead.

Figure 6A:
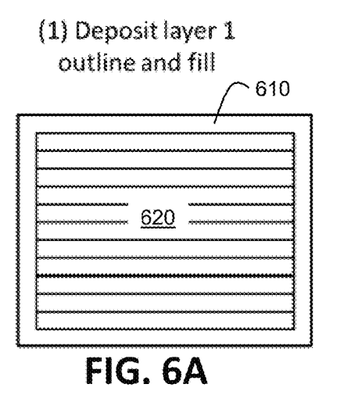
FIGS. 6A-6D illustrate an embodiment of rotating a part as the part is being additively manufactured by at least the system of FIG. 1.
Figure 6B:
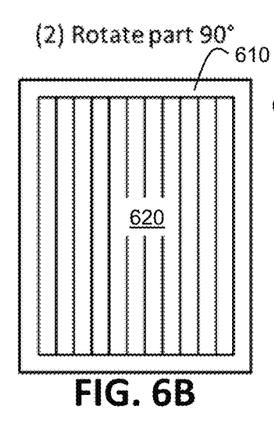
Figure 6C:
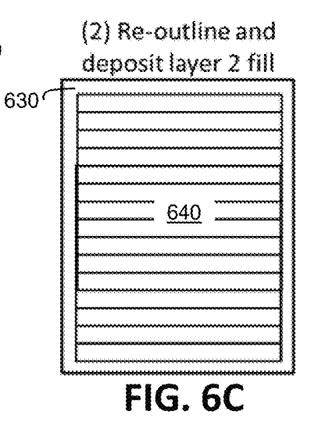

FIGS. 6A-6D illustrate an embodiment of rotating a part 600 as the part is being additively manufactured by at least the system 10 of FIG. 1. In FIG. 6A, a first contour outline portion 610 and a first fill portion 620 of a first layer of the part 600 are shown as having been deposited when the part 600 is in a first orientation. In FIG. 6B, the part 600 is shown as having been rotated 90° to a second orientation. In FIG. 6C, a second contour outline portion 630 and a second fill portion 640 of a second layer of the part 600 are shown as having been deposited over the first layer. In this manner, a part may be additively manufactured using, for example, the systems 10 and 100 as described herein, where the part is rotated 90° between depositions of each layer of the part.

Figure 6D:
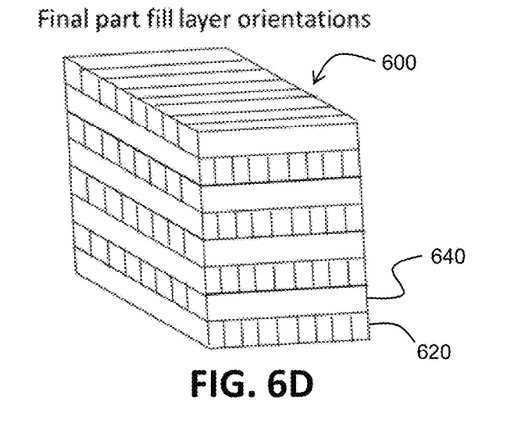

FIG. 6D shows the fill layers of the final part 600 due to the rotations as the part 600 was built up. Rotating the part in this manner between layers helps to minimize distortion of the layers and may add to the overall strength and durability of the part. In one embodiment, the part is rotated via the robot 90 and the platform 93 under the control of the controller 80 of the system 10. In accordance with another embodiment, instead of rotating the part, the electrode head 20 of the system 10 may be rotated 90° to effectively accomplish formation of the same alternating rotated layers of the part.

Figure 7:
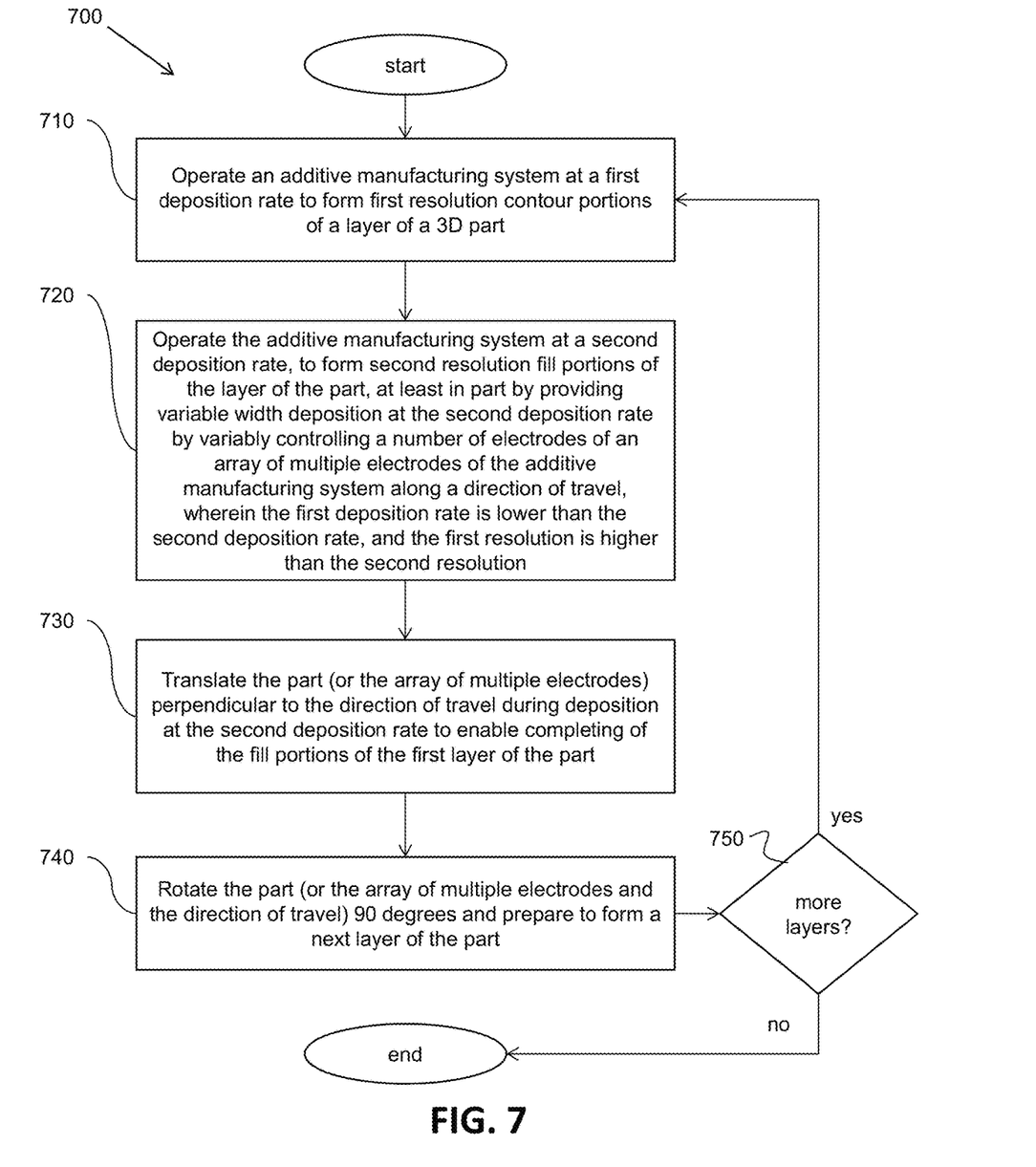
FIG. 7 illustrates a flow chart of an embodiment of a method to create a part using hybrid deposition rate additive manufacturing.

FIG. 7 illustrates a flow chart of an embodiment of a method 700 to create a part using hybrid deposition rate additive manufacturing. At 710, an additive manufacturing system is operated at a first deposition rate to form first resolution contour portions of a first layer of a three-dimensional (3D) part. At 720, the additive manufacturing system is operated at a second deposition rate to form second resolution fill portions of the first layer. The fill portions are formed by providing variable width deposition at the second deposition rate by variably controlling a number of electrodes (e.g., wires) of an array of multiple electrodes of the additive manufacturing system along a direction of travel. In one embodiment, the first deposition rate is lower than the second deposition rate, and the first resolution is higher than the second resolution.

At 730, the part (or the array of multiple electrodes) is translated perpendicular to the direction of travel of the array of multiple electrodes during deposition at the second deposition rate to enable completing of the fill portions of the first layer of the part. Such translation may be appropriate when the part is wider than the array of multiple electrodes, for example. At 740, the part (or the array of multiple electrodes and the direction of travel) is rotated by 90 degrees in preparation for forming a next layer of the part. Such rotation helps to minimize distortion of the layers and may add to the overall strength and durability of the part. At 750, a determination is made as to whether there are more layers of the part to be deposited. When there are more layers to be deposited, the method 700 reverts back to 710 to deposit the next layer. Otherwise, the method 700 ends. The steps 710 through 750 are repeated for each layer of the part to be deposited. The part and/or the array of multiple electrodes may be rotated and/or translated as previously described herein via at least one of electrically driven means, pneumatically driven means, or hydraulically driven means.

Figure 8:
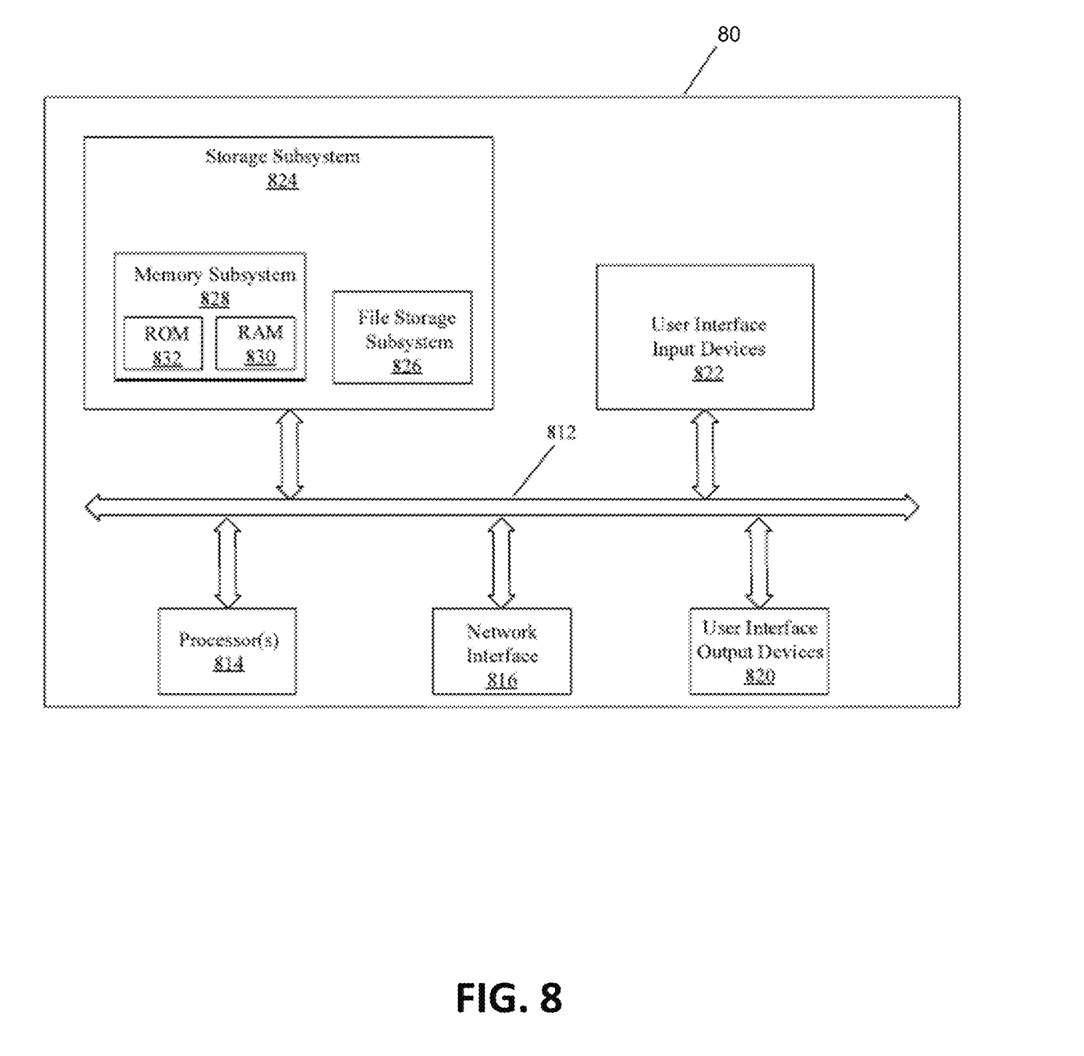
FIG. 8 illustrates an embodiment of an example controller of the additive manufacturing system of FIG. 1.

FIG. 8 illustrates an embodiment of an example controller 80 of the additive manufacturing system 10 of FIG. 1. The controller 80 includes at least one processor 814 which communicates with a number of peripheral devices via bus subsystem 812. These peripheral devices may include a storage subsystem 824, including, for example, a memory subsystem 826 and a file storage subsystem 828, user interface input devices 822, user interface output devices 820, and a network interface subsystem 816. The input and output devices allow user interaction with the controller 80. Network interface subsystem 816 provides an interface to outside networks and is coupled to corresponding interface devices in other computer systems. For example, the motion controller 180 of the system 100 may share one or more characteristics with the controller 80 and may be, for example, a conventional computer, a digital signal processor, and/or other computing device.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 80 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 80 to the user or to another machine or computer system.

Storage subsystem 824 stores programming and data constructs that provide the functionality of some or all of the modules described herein. For example, the storage subsystem 824 may include a CAD model of a part to be additively manufactured and the logic to identify variations in a welding location and adjust a welding device to accommodate the identified variations.

These software modules are generally executed by processor 814 alone or in combination with other processors. Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 828 in the storage subsystem 824, or in other machines accessible by the processor(s) 814.

Bus subsystem 812 provides a mechanism for letting the various components and subsystems of the controller 80 communicate with each other as intended. Although bus subsystem 812 is shown schematically as a single bus, alternative embodiments of the bus subsystem may use multiple buses.

The controller 80 can be of varying types including a workstation, server, computing cluster, blade server, server farm, or any other data processing system or computing device. Due to the ever-changing nature of computing devices and networks, the description of the controller 80 depicted in FIG. 8 is intended only as a specific example for purposes of illustrating some embodiments. Many other configurations of the controller 80 are possible having more or fewer components than the controller depicted in FIG. 8.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. An additive manufacturing system, comprising:
   an array of multiple electrodes for sequentially depositing material layer by layer to form a three-dimensional (3D) part;
   a power source configured to provide electrical power for establishing a welding arc for each electrode of the array of multiple electrodes;
   a drive roll configured to independently drive each electrode of the array of multiple electrodes; and
   a controller configured to:
   operate the additive manufacturing system at a first deposition rate to form first resolution contour portions of at least two deposited features within a layer of the part, and
   operate the additive manufacturing system at a second deposition rate, to form second resolution fill portions of the at least two deposited features within the layer of the part, at least in part by providing variable width deposition across the layer of the part at the second deposition rate using a variable number of electrodes of the array of multiple electrodes,
   wherein each of the at least two deposited features are of varying width and length within the layer,
   wherein each of the at least two deposited features comprises the first resolution contour portion and the second resolution fill portion, and
   wherein the first deposition rate is lower than the second deposition rate and the first resolution is higher than the second resolution.

2. The additive manufacturing system of claim 1, wherein the electrodes of the array of multiple electrodes are consumable welding wires.

3. The additive manufacturing system of claim 1, wherein the additive manufacturing system is a submerged arc welding (SAW) system.

4. The additive manufacturing system of claim 1, further comprising a rotatable platform for supporting the part, wherein the controller is configured to command a rotation of the rotatable platform by 90° between layers, and wherein the rotatable platform is one of electrically driven, pneumatically driven, or hydraulically driven.

5. The additive manufacturing system of claim 1, further comprising a translatable platform for supporting the part, wherein the controller is configured to command a translation of the translatable platform perpendicular to a direction of travel of the array of multiple electrodes during deposition at the second deposition rate to enable completing of the fill portions of the layer of the part, and wherein the translatable platform is one of electrically driven, pneumatically driven, or hydraulically driven.

6. The additive manufacturing system of claim 1, wherein the controller is configured to command a rotation of the array of multiple electrodes and a direction of travel of the array of multiple electrodes by 90° between layers, and wherein the rotation of the array of multiple electrodes is one of electrically driven, pneumatically driven, or hydraulically driven.

7. The additive manufacturing system of claim 1, wherein the controller is configured to command a translation of the array of multiple electrodes perpendicular to a direction of travel of the array of multiple electrodes during deposition at the second deposition rate to enable completing of the fill portions of the layer of the part, and wherein the translation of the array of multiple electrodes is one of electrically driven, pneumatically driven, or hydraulically driven.

8. The additive manufacturing system of claim 1, wherein the controller is programmed to operate the additive manufacturing system to deposit the material at areas defined by a computer aided design (CAD) model of the part.

9. The additive manufacturing system of claim 1, wherein the material includes metal.

10. An additive manufacturing method, the method comprising:
    operating an additive manufacturing system at a first deposition rate to form first resolution contour portions of at least two deposited features within a first layer of a three-dimensional (3D) part; and
    operating the additive manufacturing system at a second deposition rate, to form second resolution fill portions of the at least two deposited features within the first layer of the part, at least in part by providing variable width deposition across the first layer of the part at the second deposition rate by variably controlling a number of electrodes of an array of multiple electrodes of the additive manufacturing system along a direction of travel,
    wherein each of the at least two deposited features are of varying width and length within the first layer,
    wherein each of the at least two deposited features comprises the first resolution contour portion and the second resolution fill portion, and
    wherein the first deposition rate is lower than the second deposition rate and the first resolution is higher than the second resolution.

11. The method of claim 10, further comprising translating the part perpendicular to the direction of travel of the array of multiple electrodes during deposition at the second deposition rate to enable completing of the fill portions of the first layer of the part.

12. The method of claim 10, further comprising:
    rotating the part 90° degrees;
    operating the additive manufacturing system at the first deposition rate to form first resolution contour portions of a second layer of the three-dimensional (3D) part; and
    operating the additive manufacturing system at the second deposition rate, to form second resolution fill portions of the second layer of the part, at least in part by providing variable width deposition at the second deposition rate by variably controlling a number of electrodes of the array of multiple electrodes of the additive manufacturing system along the direction of travel.

13. The method of claim 10, further comprising translating the array of multiple electrodes perpendicular to the direction of travel of the array of multiple electrodes during deposition at the second deposition rate to enable completing of the fill portions of the first layer of the part.

14. The method of claim 10, further comprising:
    rotating the array of multiple electrodes and the direction of travel of the array of multiple electrodes by 90°;
    operating the additive manufacturing system at the first deposition rate to form first resolution contour portions of a second layer of the three-dimensional (3D) part; and
    operating the additive manufacturing system at the second deposition rate, to form second resolution fill portions of the second layer of the part, at least in part by providing variable width deposition at the second deposition rate by variably controlling a number of electrodes of the array of multiple electrodes of the additive manufacturing system along the direction of travel as rotated.

15. An additive manufacturing system for sequentially depositing material layer by layer to form a three-dimensional (3D) part, the system comprising:
- a first subsystem configured to deposit material at a first deposition rate to form first resolution contour portions of at least two deposited features within a layer of the part;
- a second subsystem configured to deposit material at a second deposition rate, to form second resolution fill portions of the at least two deposited features within the layer of the part, wherein the second subsystem includes:
- an array of multiple electrodes;
- a power source configured to provide electrical power for establishing a welding arc for each electrode of the array of multiple electrodes;
- a drive roll configured to independently drive each electrode of the array of multiple electrodes; and
- a controller configured to operate the second subsystem at the second deposition rate at least in part by providing variable width deposition across the layer of the part at the second deposition rate using a variable number of electrodes of the array of multiple electrodes,
- wherein each of the at least two deposited features are of varying width and length within the layer,
- wherein each of the at least two deposited features comprises the first resolution contour portion and the second resolution fill portion, and
- wherein the first deposition rate is lower than the second deposition rate and the first resolution is higher than the second resolution.

16. The additive manufacturing system of claim 15, wherein the electrodes of the array of multiple electrodes are consumable welding wires.

17. The additive manufacturing system of claim 15, wherein the second subsystem is a submerged arc welding (SAW) system.

18. The additive manufacturing system of claim 15, wherein the first subsystem is a laser hot wire (LHW) system.

19. The additive manufacturing system of claim 15, wherein the first subsystem is a gas tungsten arc welding (GTAW) system.

20. The additive manufacturing system of claim 15, wherein the first subsystem is a blown powder system.

* * * * *